US008181667B2

(12) United States Patent
Ford

(10) Patent No.: US 8,181,667 B2
(45) Date of Patent: May 22, 2012

(54) GTANK-C90 AUXILIARY FUEL TRANSFER SYSTEM

(76) Inventor: Gary A. Ford, Renton, WA (US)

( * ) Notice: Subject to any disclaimer, the term of this patent is extended or adjusted under 35 U.S.C. 154(b) by 1150 days.

(21) Appl. No.: 11/743,584

(22) Filed: May 2, 2007

(65) Prior Publication Data

US 2010/0263739 A1    Oct. 21, 2010

Related U.S. Application Data

(60) Provisional application No. 60/796,594, filed on May 2, 2006.

(51) Int. Cl.
E03B 11/00 (2006.01)
B67D 7/08 (2010.01)

(52) U.S. Cl. .................. 137/255; 137/565.16; 137/899; 180/69.4

(58) Field of Classification Search .................. 137/255, 137/256, 899, 565.16; 280/834, 835; 180/69.4, 180/69.5
See application file for complete search history.

(56) References Cited

U.S. PATENT DOCUMENTS

| 5,806,473 A * | 9/1998 | Kometani et al. ........... 123/73 C |
| 2008/0011743 A1 * | 1/2008 | Edwards ...................... 220/4.14 |
| 2008/0233437 A1 * | 9/2008 | Muramatsu et al. ............ 429/13 |

* cited by examiner

Primary Examiner — Kevin Lee

(57) ABSTRACT

The GTank-C90 Auxiliary Fuel Transfer System consists of an auxiliary fuel transfer cell 1 that connects to and becomes an integral part of the increased fuel capacity of the motorcycle extending its usable riding range. The GTank-C90 Auxiliary Fuel Transfer System enables fuel transfer from the auxiliary fuel transfer cell 1, to the stock fuel tank 17 by activation of the momentary toggle switch 21, activating the Fuel Transfer Pump Timed Electrical circuit, transferring fuel for a predetermined time to allow for complete transfer of fuel. This fuel transfer is designed for use during normal operation of the motorcycle without disruption of use or adversely affecting the operation.

10 Claims, 2 Drawing Sheets

FUEL SYSTEM

FUEL SYSTEM

FUEL TRANSFER PUMP TIMED ELECTRICAL SCHEMATIC

GTANK-C90 AUXILIARY FUEL TRANSFER SYSTEM

The GTank-C90 Auxiliary Fuel Transfer System is designed for motorcycles with fuel systems adaptable to its use. The GTank-C90 Auxiliary Fuel Transfer System is incorporated into and becomes an integral part of the fuel system of the motorcycle by installation of an auxiliary fuel cell 1, additional fuel lines 2, 7, 9, 11, 12, 14, 16, connectors 3, 5, 8, electric fuel pump 13, electronic timer 20, relay 19, toggle switch 21 and revised fuel system as designed, drawn and included here in and as described to enable its use as an integral part of the motorcycle.

The GTank-C90 Auxiliary Fuel Transfer System is detailed in the Fuel System Routing Schematic drawings including all the specific components such as hoses 2, 4, 7, 9, 11, 12, 14, 16, connectors 3, 5, 8, clamps at all hose ends, fuel cell 1, 17, check valve 10 and fuel filter 15. The Fuel Transfer Pump Timed Electrical Schematic details all wiring, connectors, electronic timer 20, relay 19, wiring harness, 12 volt power source connection 22, toggle switch 21, electronic fuel pump 13, fuse and fuse holder 23.

BACK GROUND OF INVENTION

Many motorcycles have less than adequate fuel capacities that limit their ability and usability for extended distances and usage time frames.

Limited fuel capacity can affect route choices extending ride durations adding to the dangers inherent in the same.

The GTank-C90 Auxiliary Fuel Transfer System reduces the need for frequent fuel stops expanding the usable range of the motorcycle while making riding safer and more versatile for the operator.

BRIEF SUMMARY OF INVENTION

The installation and use of the GTank-C90 Auxiliary Fuel Transfer System will extend the usable range of any motorcycle incorporating its use and allowing for greater, more diverse and safer use of the same.

The GTank-C90 Auxiliary Fuel Transfer System does not diminish from the luggage or storage capacity of the motorcycle effectively increasing its usable range.

The GTank-C90 Auxiliary Fuel Transfer System adds to and becomes an integral part of the motorcycle fuel system by adding a timed fuel transfer pump circuit incorporating an emergency shut-off relay and easy access toggle activation switch without affecting emissions and/or normal usage and is designed to be activated at the operators will without adversely affecting the originally designed operational parameters of the fuel system of the motorcycle.

DETAILED DESCRIPTION OF INVENTION

Figure 1:
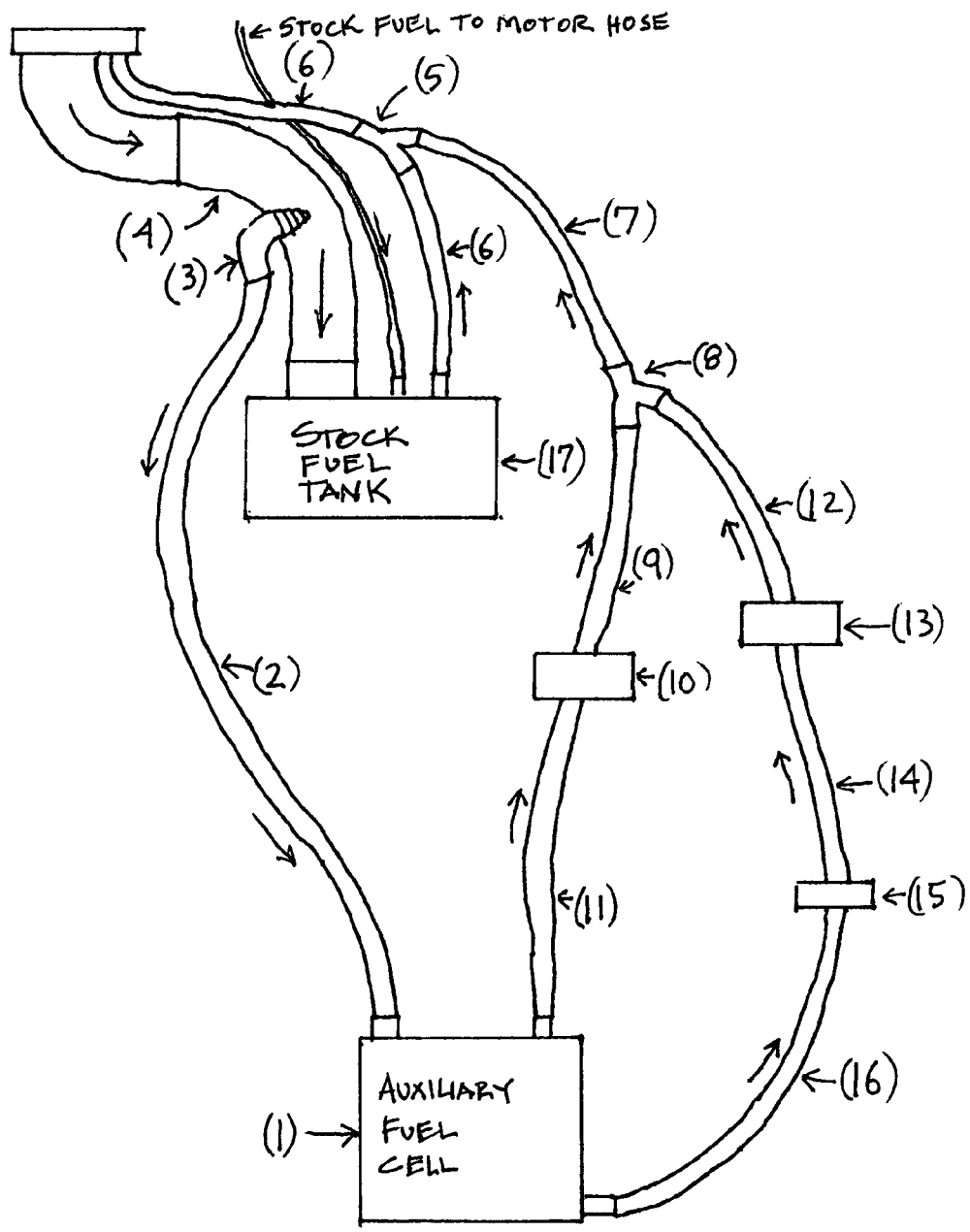
FIG. 1: Fuel System—Details the added/revised fuel transfer lines 6, 7, 12, 14, 16, fuel fill lines 2, 4, vent lines 6, 7, 9, 11, connectors 3, 5, 8, auxiliary fuel cell 1, check valve 10, fuel filter 15 stock fuel tank 17 for proper operation of the GTank-C90 Auxiliary Fuel Transfer System.
Figure 2:
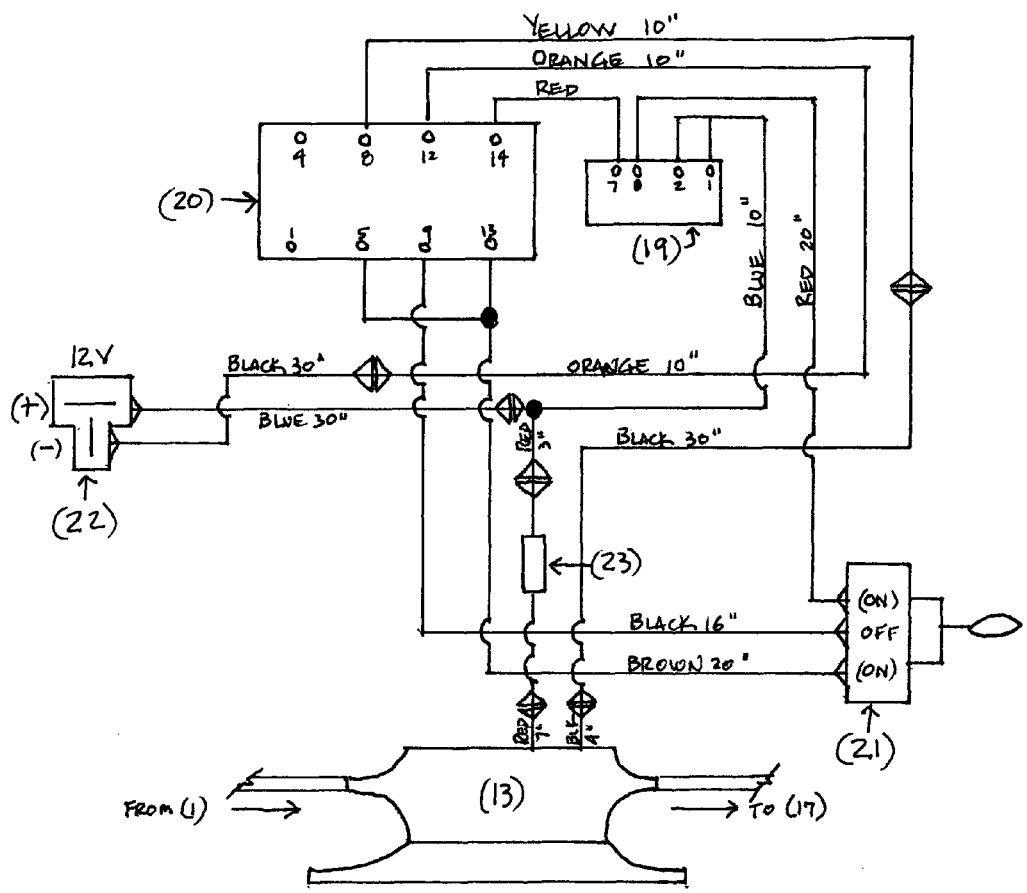
FIG. 2: Fuel Transfer Pump Timed Electrical Schematic—Details the 12 volt power source 22, electronic timer 20, timer relay 19, toggle switch 21, electronic fuel pump 13, the fuse holder 23, electrical connections for the operation of the GTank-C90 Auxiliary Fuel Transfer System.

The GTank-C90 Auxiliary Fuel Transfer System consists of an auxiliary fuel cell to operatively fit the motorcycle frame utilizing these added/revised fuel lines, vent lines, fuel fill lines, fuel transfer lines, connectors, couplers, electric fuel pump, toggle switch, electronic timer, relay, wiring, fuse and connectors.

Fuel Lines Revisions:

The added/revised fuel, vent & fill lines, consisting of 7 lines, for the GTank-C90 Auxiliary Fuel Transfer System are as follows:

Line 7: Routes from the dual end side of the first Y connector 5 to the single end side of the second Y connector 8.

Line 9: Routes from the dual end side of the second Y connector 8 to the out flow side of the check valve 10.

Line 11: Routes from the in flow side of the check valve 10 to top of auxiliary fuel cell 1.

Line 12: Routes from the dual end side of the second Y connector 8 to fuel out flow side of electronic fuel pump 13.

Line 14: Routes from in flow side of electronic fuel pump 13 to the out flow side of fuel filter 15.

Line 16: Routes from in flow of fuel filter 15 to bottom of auxiliary fuel cell.

Line 2: Routes from L connector at stock filler hose 4 to top of auxiliary fuel cell 1.

Connectors (3ea):

The connectors are made of automotive fuel resistant, material allowing for revisions and additions to the existing fuel system and hoses as follows:

The L connector 3 coupled to the GTank-C90 Auxiliary Fuel Transfer System fuel fill line 2 at stock filler hose 4 allowing for filling of auxiliary fuel cell 1 and stock fuel tank 17.

Location:

The L connector 3 is operatively coupled to stock filler hose 4 enabling filling of the auxiliary fuel cell 1 and stock fuel tank 17. Existing vent line 6 is intersected by first Y connector 5 operatively coupling first Y connector 5 to existing vent line 6. Second Y connector 8 operatively coupled to first vent line 7 and second vent line 9 enabling venting and fuel transfer procedures. Check valve 10 coupled to second vent line 9 and third vent line 11 restricts possible re-circulation to auxiliary fuel cell 1 during the fuel transfer process. Fuel filter 15 coupled to second fuel transfer line 14 and third fuel transfer line 16 filters fuel prior to passing through electronic fuel pump 13.

Fuel Pump:

The Fuel Pump 13 is an automotive style electrically operated fuel pump, that transfers fuel from the auxiliary fuel cell 1 to the stock fuel tank 17 when Fuel Transfer Pump Timed Electrical circuit is activated.

Electrical Components:

Timer Circuit:

Electronic timer 20 is a 12 volt electrically controlled adjustable timer used for controlling 12 volt power to the electronic fuel pump 13 enabling a pre set time period for complete transfer of fuel from the auxiliary fuel cell 10 to the stock fuel tank 17. The electronic timer 20 enables proper timing of fuel transfer eliminating the need for manual shut off of electronic fuel pump 13 upon completion of fuel transfer. Automatic shut off by electronic timer 20 is a safety feature for motorcycle operator and fuel pump longevity.

Emergency Shut Off Circuit:

Relay 19 is operatively connected to the electronic timer 20 allowing operator to shut down the GTank-C90 Auxiliary Fuel Transfer System during operation by engaging the toggle switch 21 to activate the relay 19 which in turn shuts off the electrical timer 20 stopping all 12 volt power 22.

Fuel Toggle Switch:

Toggle Switch 21 is a SPDT Switch, single pole double throw, with momentary on in both up and down positions. Center switch position being off. Toggle switch 21 up position activates the timer 20 and electronic fuel pump 13. Toggle switch 21 down position activates the relay 19 shutting off the electronic timer 20, turning off the electronic fuel pump 13 shutting down the fuel transfer process from the auxiliary fuel cell 1 to the stock fuel tank 17. The toggle switch is electrically connected to the GTank-C90 Auxiliary Fuel Transfer System. The Switch is self centering remaining in the off position when no force is being applied to the toggle switch 21.

Fuse Holder:

In line fuse holder 23, an in line 5 amp fuse holder including a 5 amp fuse. For use in protecting the fuel pump 13 from power surges or shorts. This in line Fuse Holder 23 is operatively connected to the power wiring circuit of the electronic fuel pump 13.

Operation:

The GTank-C90 Auxiliary Fuel Transfer System is filled in the same operation as the stock fuel tank 17 in the fuel filler location. The filling process is complete when fuel remains visible in the stock filler hose and no longer drains down into either the stock tank 17 or auxiliary fuel cell 1.

The stored fuel of the GTank-C90 Auxiliary Fuel Transfer System is held in the auxiliary fuel cell 1 until the stock fuel tank 17 diminished contents due to use, allows for complete transfer of the fuel at which time toggle switch 21 is activated, activating fuel transfer pump timed electrical circuit, transferring fuel from the auxiliary fuel cell 1 to stock fuel tank 17 extending uninterrupted operation of the motorcycle.

During the transfer process, and at all times, fuel for motorcycle operation is being drawn from the stock fuel tank 17 per manufacturers stock design parameters. Normal operation of the motorcycle is not affected by the fuel transfer process of the GTank-C90 Auxiliary Fuel transfer System. During motorcycle operation Fuel Transfer Pump Timed Electrical Circuit can be activated by toggle switch 21 transferring fuel through GTank-C90 Auxiliary Fuel Transfer System. Upon activation fuel is drawn from the auxiliary fuel cell 1 through the fuel filter 15, through the electronic fuel pump 13, through the second Y connector 8, through the first Y connector 5, through existing vent line 6 to stock fuel tank 17. Check valve 10 keeps fuel from re-circulating into the auxiliary fuel cell 1, through second Y connector 8 and second vent line 9 and third vent line 11. The electronic timer 20 shuts off power to the electronic fuel pump 13 at a preset length of time allowing for complete fuel transfer from auxiliary fuel cell 1 to stock fuel tank 17.

The stock fuel tank 17, which is the fuel source for motorcycle operation, is refilled during the GTank-C90 Auxiliary Fuel Transfer System operation. The fuel transfer is designed to operate during normal motorcycle usage without disruption of the same.

What is claimed is as follows:

1. A motorcycle having a first existing fuel system and an auxiliary fuel cell (1) comprising: a fill line (2) with first and second ends, wherein the first end is coupled to the top of the auxiliary fuel cell (1) wherein the second end is coupled to an end of a L connector (3); the L connector (3) operatively connected to a stock filler hose (4); a first Y connector (5) operatively connected to an existing vent line (6); a first vent line (7) with first and second ends, wherein the second end is coupled to one leg of the first Y connector (5); wherein the second end is coupled to one leg of a second Y connector (8); a second vent line (9) with first and second ends, wherein the first end is coupled to one leg of the second Y connector (8), wherein the second end is coupled to an outflow of a check valve (10); a third vent line (11) with first and second ends, wherein the first end is coupled to an inflow of the check valve (10), wherein the second end is coupled to the top of the auxiliary fuel cell (1); a first fuel transfer line (12) with first and second ends, wherein the first end is coupled to one leg of said second Y connector (8) wherein the second end is coupled to an outflow of an electronic fuel transfer pump (13); a second fuel transfer line (14) with first and second ends, wherein the first end is coupled to an inflow of the electronic fuel pump (13); wherein the second end is coupled to an output end of a fuel filter (15); a third fuel transfer line (16) with first and second ends, wherein the first end is coupled to an input end of the fuel filter (15), wherein the second end is coupled to the bottom of the auxiliary fuel cell (1); the electronic fuel transfer pump (13) wherein a 12 volt electrical power source (22) from the motorcycle is operatively connected to the fuel transfer pump (13), through a relay (19), a electronic timer (20), a fused link (23), and a toggle switch (21) which activates and deactivates the electronic fuel transfer pump (13), by which fuel is transferred from the auxiliary fuel cell (1) to a stock fuel tank (17).

2. The motorcycle of claim 1 wherein the motorcycle is any motorcycle adaptable to the auxiliary fuel cell (1), the fill line (2), the L connector (3), the stock filler hose (4), the first Y connector (5), the existing vent line (6), the first vent line (7), the second Y connector (8), the second vent line (9), the check valve (10), the third vent line (11), the first fuel transfer line (12), the electronic fuel transfer pump (13), the second fuel transfer line (14), the fuel filter (15), the third fuel transfer line (16), the stock fuel tank (17), the relay (19), the electronic timer (20), the toggle switch (21), the 12 volt electrical power source (22), the fused link (23).

3. The motorcycle of claim 1 wherein the L connector (3) is operatively coupled to the-stock filler hose (4) at a location to allow for transfer of fuel between the filler hose (4) and the fill line (2).

4. The motorcycle of claim 1 wherein the first Y connector (5) operatively coupled to the existing vent line (6) allowing simultaneous venting of the auxiliary fuel cell (1) and the stock fuel tank (17).

5. The motorcycle of claim 1 with the L connector (3) and the Y connectors (5) and (8) to be constructed from automotive fuel compatible materials.

6. The motorcycle of claim 1 wherein the check valve (10) is directionally connected allowing venting from the auxiliary fuel cell (1) through the third vent line (11), through the second vent line (9), through the second Y connector (8), through the first vent line (7), through the first Y connector (5), through the existing vent line (6).

7. The motorcycle of claim 1 wherein the first vent line (7), the second vent line (9), the third vent line (11), the first fuel transfer line (12), the second fuel transfer line (14), the third fuel transfer line (16) and the fuel fill line (2) are constructed of automotive fuel compatible materials.

8. The motorcycle of claim 1 wherein, the fuel filter (15) filters fuel flowing to the electronic fuel pump (13) from the auxiliary fuel cell (1).

9. The motorcycle of claim 1 wherein fuel is transferred from the auxiliary fuel cell (1) to the stock fuel tank (17) through the third fuel transfer line (16), through the fuel filter (15), through the second fuel transfer line (14), through the electronic fuel pump (13), through the first fuel transfer line (12), through the second Y connector (8), through the first vent line (7), through the first Y connector (5), through the existing vent line (6).

10. The motorcycle of claim 1 wherein the 12 volt motorcycle power source (22) is operatively connected for operation of electrical components.

* * * * *